(12) United States Patent
Dong et al.

(10) Patent No.: US 10,717,801 B2
(45) Date of Patent: Jul. 21, 2020

(54) USE OF ORGANOSILANE, IN-REACTOR POLYOLEFIN ALLOY AND PREPARATION METHOD THEREOF

(71) Applicants: Institute of Chemistry, Chinese Academy of Sciences, Beijing (CN); University of Chinese Academy of Sciences, Beijing (CN)

(72) Inventors: Jinyong Dong, Beijing (CN); Yawei Qin, Beijing (CN)

(73) Assignees: INSTITUTE OF CHEMISTRY, CHINESE ACADEMY OF SCIENCES, Beijing (CN); UNIVERSITY OF CHINESE ACADEMY OF SCIENCES, Beijing (CN)

( * ) Notice: Subject to any disclaimer, the term of this patent is extended or adjusted under 35 U.S.C. 154(b) by 103 days.

(21) Appl. No.: 15/767,759

(22) PCT Filed: Oct. 12, 2015

(86) PCT No.: PCT/CN2015/091734
§ 371 (c)(1),
(2) Date: Apr. 12, 2018

(87) PCT Pub. No.: WO2017/063117
PCT Pub. Date: Apr. 20, 2017

(65) Prior Publication Data
US 2018/0298123 A1 Oct. 18, 2018

(51) Int. Cl.
| | | |
|---|---|---|
| C08F 230/08 | (2006.01) | |
| C08F 210/02 | (2006.01) | |
| C08F 210/06 | (2006.01) | |
| C08J 3/24 | (2006.01) | |
| C08K 5/54 | (2006.01) | |
| C08F 210/16 | (2006.01) | |
| C08F 4/646 | (2006.01) | |
| C08F 4/649 | (2006.01) | |
| C08F 4/658 | (2006.01) | |

(52) U.S. Cl.
CPC ............ *C08F 230/08* (2013.01); *C08F 4/646* (2013.01); *C08F 4/649* (2013.01); *C08F 4/658* (2013.01); *C08F 210/06* (2013.01); *C08F 210/16* (2013.01); *C08J 3/24* (2013.01); *C08K 5/54* (2013.01)

(58) Field of Classification Search
CPC ............................... C08F 30/08; C08F 230/08
USPC ....................................................... 526/279
See application file for complete search history.

(56) References Cited

U.S. PATENT DOCUMENTS

| | | | |
|---|---|---|---|
| 4,229,558 A | 10/1980 | Kakogawa et al. | |
| 5,081,190 A * | 1/1992 | Asanuma ............. | C08F 297/06 525/268 |
| 5,550,194 A * | 8/1996 | Hoxmeier ............ | C08G 81/021 525/250 |
| 2003/0212225 A1 * | 11/2003 | Wang .................... | C07C 309/82 526/242 |
| 2008/0234448 A1 | 9/2008 | Pratt | |

FOREIGN PATENT DOCUMENTS

| | | |
|---|---|---|
| CN | 1057467 A | 1/1992 |
| CN | 1965004 A | 5/2007 |
| CN | 103665203 A | 3/2014 |
| CN | 103665204 A | 3/2014 |
| CN | 104448063 A | 3/2015 |
| JP | 61207406 A | 9/1986 |
| JP | 63238109 A | 10/1988 |
| WO | 9901485 A1 | 1/1999 |
| WO | 2011028523 A2 | 3/2011 |

OTHER PUBLICATIONS

Entitled "The Discovery of Metallocene Catalysts and Their Present State of the Art" authored by Kaminsky and published in the Journal of Polymer Science, Part A: Polymer Chemistry (2004) 42, 3911-3921.*

* cited by examiner

*Primary Examiner* — Marc S Zimmer
(74) *Attorney, Agent, or Firm* — Volpe and Konig, P.C.

(57) ABSTRACT

Provided are use of organosilane, in-reactor polyolefin alloy and preparation method thereof. The method of preparing an in-reactor polyolefin alloy comprises: conducting the first polymerization reaction of the first olefin monomer in the presence of a catalyst, and then charging the second olefin monomer into the polymerization reaction system to perform the second polymerization reaction, wherein the first olefin monomer is different from the second olefin monomer, wherein the first polymerization reaction and/or the second polymerization reaction are/is executed in the presence of organosilane represented by a general formula $R^1{}_m SiX_n(OR^2)_k$, wherein $R^1$ is a $C_2$-$C_{20}$ alkyl; a terminal of $R^1$ has an α-olefin double bond, a norbornene group, a cycloalkene group, or a dicyclopentadiene group; X is a halogen element; $R^2$ is a $C_1$-$C_{20}$ straight chain, a $C_1$-$C_{20}$ branched chain, or an isomerized alkyl group; m is an integer from 1-3; n is an integer from 1-3; k is an integer from 0-2; and m, n, and k satisfy the following condition: m+n+k=4. The in-reactor polyolefin alloy obtained by the above method has a high degree of crosslinking in a rubber phase, high impact resistance, and low tensile strength at break.

8 Claims, No Drawings

USE OF ORGANOSILANE, IN-REACTOR POLYOLEFIN ALLOY AND PREPARATION METHOD THEREOF

CROSS REFERENCE TO RELATED APPLICATION

This application is a 35 USC § 371 National Stage application of International Patent Application No. PCT/CN2015/091734, which was filed Oct. 12, 2015, was entitled "Use of Organic Siloxane, and Polyolefin In-Reactor Alloy and Preparation Method Thereof," and is incorporated herein by reference as if fully set forth.

FIELD OF THE INVENTION

The present invention relates to the olefin polymerization field, in particular to a use of organosilane in preparation of an in-reactor polyolefin alloy, a method of preparing an in-reactor polyolefin alloy, and an in-reactor polyolefin alloy prepared by the method.

BACKGROUND OF THE INVENTION

A polyolefin blending technique is a technique of directly melting and blending compatible homopolymer/homopolymer, homopolymer/copolymer, or copolymer/copolymer to product a polymer alloy. An in-reactor polyolefin alloy is a polyolefin alloy obtained directly from reacting monomers through in-reactor polymerization. That method replaces the traditional blending method that melts and blends polymer components in the prior art. Among in-reactor polyolefin alloys, the most common in-reactor polyolefin alloy is in-reactor polypropylene alloy, which is usually produced by forming propylene into porous polypropylene particles through polymerization in the presence of a olefin polymerization catalyst and then charging a comonomer of ethylene and α-olefin into the polymerization system to perform a copolymerization reaction in the porous polypropylene particles so that the elastic copolymer generated fills up the voids among the porous polypropylene particles.

In recent years, though the olefin polymerization modifiers that have new structures and new features have been discovered and applied in researches for improving the performance of in-reactor polyolefin alloys continuously, effective catalytic polymerization means for preparing some high-performance in-reactor polyolefin alloys that have wide application prospects are still inadequate. For example, polypropylene-based thermoplastic elastomers (Thermoplastic Dynamic Vulcanizate, TPV) in which the rubber phase is in a crosslinked structure have outstanding mechanical properties and high added values, and have wide application prospects in high-end application domains. However, the existing TPV products are mainly obtained through modification processes after polymerization (dynamic vulcanization and crosslinking). There is no report on preparation of TPV through a polymerization process.

Making the rubber phase crosslinked through polymerization has advantages in many aspects: 1.) a complex post-modification process is omitted, and the increased cost incurred by the process is eliminated; 2.) the in-reactor crosslinking technique has characteristics including controllable degree of crosslinking and more diversified products, and thereby a series of in-reactor polyolefin alloys, such as in-reactor polyolefin alloys with high rubber content (rubber mass percent is 50 mass % or higher), high impact-resistant in-reactor polyolefin alloys, and polypropylene-based thermoplastic elastomers (TPV) which rubber phase is in a crosslinked structure, etc., can be prepared in a controlled manner by adjusting the kind of crosslinking monomer and addition amount; 3) the dependency on the polymerization catalyst and the polymerization process is lower.

Content of the Invention

The present invention is to provide a use of organosilane in preparation of an in-reactor polyolefin alloy, a method of preparing an in-reactor polyolefin alloy, and an in-reactor polyolefin alloy prepared by the method.

Specifically, the present invention provides a use of organosilane in preparation of an in-reactor polyolefin alloy, wherein the organosilane is represented by a general formula $R^1_m SiX_n(OR^2)_k$, wherein $R^1$ is a $C_2$-$C_{20}$ alkyl group and a terminal of $R^1$ has an α-olefin double bond, a norbornene group, a cycloolefin group or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

The present invention further provides a method of preparing an in-reactor polyolefin alloy comprising: conducting the first polymerization reaction of the first olefin monomer in the presence of a catalyst, and then charging the second olefin monomer into the polymerization reaction system to perform the second polymerization reaction, wherein the first olefin monomer is different from the second olefin monomer, wherein the first polymerization reaction and/or the second polymerization reaction are/is executed in the presence of organosilane represented by a general formula $R^1_m SiX_n(OR^2)_k$, wherein $R^1$ is a $C_2$-$C_{20}$ alkyl group and a terminal of $R^1$ has an α-olefin double bond, a norbornene group, a cycloolefin group or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

Furthermore, the present invention further provides an in-reactor polyolefin alloy obtained by the above-mentioned method.

Through in-depth research, the inventor of the present invention has found that the organosilane represented by the general formula $R^1_m SiX_n(OR^2)_k$ behaves quite differently from the organosilane represented by a general formula $Si(OR')_4$ (wherein R' is a $C_1$-$C_{20}$ alkyl group) and the organohalosilane represented by a general formula $SiX'_4$ (wherein X' is a halogen element) during the in-reactor polyolefin alloy preparation process. If the first and/or the second polymerization reaction in the in-reactor polyolefin alloy preparation process are executed in the presence of the organosilane represented by the general formula $R^1_m SiX_n(OR^2)_k$, the degree of crosslinking of the rubber phase in the obtained in-reactor polyolefin alloy is higher, and the in-reactor polyolefin alloy has higher impact toughness and lower tensile breaking strength.

According to the preferred example of the present invention, if the $R^1$ in the organosilane is a $C_2$-$C_{20}$ alkyl group and a terminal of $R^1$ has an α-double bond, a norbornene group, a cycloolefin group or a dicyclopentadiene group, X is a halogen element, $R^2$ is a $C_1$-$C_{10}$ linear chain, branched chain or isomerized alkyl group, m is 2 or 3, n is 1 or 2, k is 0, and m+n+k=4, the rubber phase in the obtained in-reactor polyolefin alloy is crosslinked to a higher degree, and the in-reactor polyolefin alloy has higher impact strength and lower tensile breaking strength.

Other features and advantages of the present invention will be further detailed in the examples hereunder.

DETAILED DESCRIPTION OF THE EXAMPLES

Hereunder some examples of the present invention will be detailed. It should be understood that the examples described here are only provided to describe and explain the present invention, but shall not be deemed as constituting any limitation to the present invention.

The present invention provides a use of organosilane in preparation of an in-reactor polyolefin alloy, wherein the organosilane is represented by a general formula $R^1{}_m SiX_n (OR^2)_k$, wherein a plurality of $R^1$ is the same general formula may be the same with or different from each other, and may be a $C_2$-$C_{20}$ alkyl group respectively and independently, and a terminal of $R^1$ has an α-olefin double bond, a norbornene group, a cycloolefin group or a dicyclopentadiene group; a plurality of X in the same general formula may be the same with or different from each other, and may be a halogen element (including fluorine, chlorine, bromine, iodine) respectively and independently; a plurality of $R^2$ in the same general formula may be the same with or different from each other, and may be a $C_1$-$C_{20}$ linear chain, branched chain or isomerized alkyl group respectively and independently; m is an integer with a range of 1-3, n is an integer within a range of 1-3, k is an integer within a range of 0-2, and m+n+k=4.

According to the present invention, preferably, a plurality of $R^1$ in the same general formula may be the same with or different from each other, and is a $C_2$-$C_{20}$ alkyl group respectively and independently, and a terminal of $R^1$ has an α-olefin double bond, a norbornene group, a cycloolefin group or a dicyclopentadiene group; a plurality of X in the same general formula may be the same with or different from each other, and is a halogen element (including fluorine, chlorine, bromine, iodine) respectively and independently; a plurality of $R^2$ in the same general formula may be the same with or different from each other, and is a $C_1$-C10 linear chain, branched chain or isomerized alkyl group respectively and independently; m is 2 or 3, n is 1 or 2, k is 0, and m+n+k=4. When the preferred organosilane is used as a modifier to prepare an in-reactor polyolefin alloy, the degree of crosslinking of the rubber phase in the obtained in-reactor polyolefin alloy can be further improved, the impact toughness of the in-reactor polyolefin alloy can be further improved, and the tensile breaking strength of the in-reactor polyolefin alloy can be further decreased.

In the case that a terminal of $R^1$ has an α-olefin double bond ($CH_2=CH-$), there is no particular restriction on the structure of the middle part of $R^1$ except for the α-olefin double bond; specifically, the middle part may include linear chain alkyl (including double bonds and triple bonds, etc.) or its isomers. In that case, examples of the organosilane include, but are not limited to at least one of 7-octenyl trichlorosilane, 5-hexenyl trichlorosilane, allyl trichlorosilane, di-(7-octenyl) dichlorosilane, di-(allyl) dichlorosilane, 7-octenyl allyl dichlorosilane, 7-octenyl vinyl dichlorosilane, 5-hexenyl allyl dichlorosilane, 7-octenyl di-(allyl) chlorosilane, di-(7-octenyl) allyl chlorosilane, and triallyl chlorosilane, etc.

In the case that the terminal of $R^1$ has a norbornene group, preferably the structure of $R^1$ is represented by the following Formula (1):

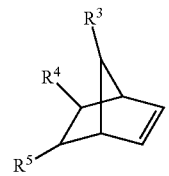

Formula (1)

Wherein, the group bonded to silicon atom may be $R^3$, $R^4$, or $R^5$, and $R^3$, $R^4$ and $R^5$ are H or $C_1$-$C_{10}$ alkyl (including alkenyl, alkynyl, or cycloalkenyl, etc.) respectively and independently, but are not limited to specific structures, including linear chain alkyl or its isomers. For example, if $R^1$ has the structure represented by Formula (1), $R^3$ is H, $R^4$ is =CH—$CH_3$, $R^5$ is ethylidene and is bonded to the silicon atom, m=2, n=2, k=0, and X is Cl, the organosilane is 2-(5-ethylidene-2-norbornene) ethyl allyl dichlorosilane; if $R^1$ has the structure represented by Formula (1), $R^3$ is H, $R^4$ is ethylidene and is bonded to the silicon atom, $R^5$ is ethyl, m=2, n=2, k=0, and X is Cl, the organosilane is di-[2-(5-ethylidene-2-norbornene) ethyl] dichlorosilane.

If a terminal of $R^1$ has a cycloolefin group, the carbon number of the cycloolefin group may be 3-10, the number of double bonds in the cycloolefin group may be 1-3, the carbon number of the alkyl chain that connects the cycloolefin group with the silicon atom may be 1-10, and the alkyl includes linear chain alkyl or its isomers. Furthermore, the ring of the cycloolefin group may have a branch chain, which preferably is $C_1$-$C_5$ alkyl. In that case, examples of the organosilane include, but are not limited to at least one of 2-(3-cyclohexenyl) ethyl trichlorosilane, 4-(2,7-cyclooctadiene) butyl trichlorosilane, 2-[2-(3-cyclohexenyl) ethyl)] dichlorosilane, 2-(dicyclopentadiene) ethylidene allyl dichlorosilane, and 2-(dicyclopentadiene) ethylidene trichlorosilane.

In the case that a terminal of $R^1$ has a dicyclopentadiene group, preferably the structure of $R^1$ is represented by the following Formula (2):

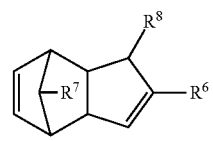

Formula (2)

Wherein, the group bonded to silicon atom may be $R^6$, $R^7$, or $R^8$, and $R^6$, $R^7$ and $R^8$ are H or $C_1$-$C_{10}$ alkyl respectively and independently, but are not limited to specific structures, including linear chain alkyl or its isomers. For example, if $R^1$ has the structure represented by Formula (2), $R^6$ is H, $R^7$ is H, $R^8$ is 1,2-ethylidene and is bonded to silicon atom, m=2, n=2, k=0, and X is Cl, the organosilane is 2-(dicyclopentadiene) ethylidene allyl dichlorosilane; if $R^1$ has the structure represented by Formula (2), $R^6$ and $R^7$ are H, $R^8$ is ethylidene and is bonded to silicon atom, m=2, n=2, k=0, and X is Cl, the organosilane is di-[2-(dicyclopentadiene) ethylidene] dichlorosilane.

As described above, the examples of the organosilane include, but are not limited to at least one of 7-octenyl trichlorosilane, 5-hexenyl trichlorosilane, allyl trichlorosilane, di-(7-octenyl) dichlorosilane, di-(allyl) dichlorosilane, 7-octenyl allyl dichlorosilane, 7-octenyl vinyl dichlorosilane, 5-hexenyl allyl dichlorosilane, 7-octenyl di-(allyl)

chlorosilane, di-(7-octenyl) allyl chlorosilane, triallyl chlorosilane, 2-(5-ethylidene-2-norbornene) ethyl allyl dichlorosilane, di-[2-(5-ethylidene-2-norbornene) ethyl] dichlorosilane, 2-(5-ethylidene-2-norbornene)-ethyl allyl dichlorosilane, 2-(5-ethylidene-2-norbornene) ethyl trichlorosilane, 2-(3-cyclohexenyl) ethyl trichlorosilane, 4-(2,7-cyclooctadiene) butyl trichlorosilane, di-[2-(3-cyclohexenyl) ethyl)] dichlorosilane, 2-(dicyclopentadiene) ethylidene allyl dichlorosilane, 2-(dicyclopentadiene) ethylidene trichlorosilane, 2-(dicyclopentadiene) ethylidene allyl dichlorosilane, and di-[2-(dicyclopentadiene) ethylidene] dichlorosilane, preferably is at least one of 7-octenyl allyl dichlorosilane, 7-octenyl vinyl dichlorosilane, 5-hexenyl allyl dichlorosilane, 7-octenyl di-(allyl) chlorosilane, di-(7-octenyl) allyl chlorosilane, di-(7-octenyl) dichlorosilane, triallyl chlorosilane, di-(allyl) dichlorosilane, 2-(5-ethylidene-2-norbornene) ethyl allyl dichlorosilane, di-[2-(5-ethylidene-2-norbornene) ethyl] dichlorosilane, di-[2-(3-cyclohexenyl) ethyl] dichlorosilane, 2-(dicyclopentadiene) ethylidene allyl dichlorosilane, and di-[2-(dicyclopentadiene) ethylidene] dichlorosilane. When the preferred organosilane is used as a modifier to prepare an in-reactor polyolefin alloy, the degree of crosslinking of the rubber phase in the obtained in-reactor polyolefin alloy can be further improved, the impact toughness of the in-reactor polyolefin alloy can be further improved, and the tensile breaking strength of the in-reactor polyolefin alloy can be further decreased.

The present invention provides a method of preparing an in-reactor polyolefin alloy comprising: conducting the first polymerization reaction of the first olefin monomer in the presence of a catalyst, and then charging the second olefin monomer into the polymerization reaction system to perform the second polymerization reaction, wherein the first olefin monomer is different from the second olefin monomer, the first polymerization reaction and/or the second polymerization reaction are/is executed in the presence of organosilane represented by a general formula $R^1{}_m SiX_n (OR^2)_k$, wherein $R^1$ is a $C_2$-$C_{20}$ alkyl group and the terminal of $R^1$ has an α-olefin double bond, a norbornene group, a cycloolefin group or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

Moreover, the specific selections of the organosilane have been described above, and will not be further detailed here.

There is no particular restriction on the dose of the organosilane in the present invention. Preferably, in relation to 100 pbw total dose of the first olefin monomer and the second olefin monomer, the total dose of the organosilane is 0.0001-20 pbw, further preferably is 0.0001-5 pbw, more preferably is 0.0005-1 pbw, optimally is 0.001-0.5 pbw. Thus, the impact toughness of the obtained in-reactor polyolefin alloy can be further improved, and the tensile breaking strength of the in-reactor polyolefin alloy can be further decreased.

According to the method of preparing an in-reactor polyolefin alloy provided in the present invention, the first polymerization reaction may be executed in the presence of the organosilane, or the second polymerization reaction may be executed in the presence of the organosilane; alternatively, both the first polymerization reaction and the second polymerization reaction may be executed in the presence of the organosilane. According to a preferred example of the present invention, the first polymerization reaction is executed without the presence of the organosilane, while the second polymerization reaction is executed in the presence of the organosilane, so as to ensure that the polymer obtained through the second polymerization reaction has a cross-linked structure or branched structure.

A main improvement in the method of preparing an in-reactor polyolefin alloy provided in the present invention lies in that the organosilane represented by the general formula $R^1{}_m SiX_n (OR^2)_k$ is added in the preparation process of the in-reactor polyolefin alloy, while the kinds of the first olefin monomer, the second olefin monomer and the catalyst and the conditions of the first polymerization reaction and the second polymerization reaction may be conventional choices in the art.

For example, both the first olefin monomer and the second olefin monomer may be monomers that can have an olefin polymerization reaction in the prior art. Specifically, the olefin monomers may be ethylene and/or α-olefin. Wherein, the α-olefin may be any mono-olefin with double bonds at the terminal of the molecular chain. For example, the α-olefin may be at least one of propylene, 1-butylene, 1-pentene, 1-hexylene, and 1-octylene. Particularly preferably, the first olefin monomer is propylene, and the second olefin monomer is a mixture of ethylene and α-olefin; in that case, the obtained in-reactor polyolefin alloy is an in-reactor polypropylene alloy. In that case, in the second polymerization reaction process, based on the total weight of the ethylene and the α-olefin, the dose of the ethylene may be 1-99 wt. %, preferably is 20-50 wt. %; the dose of the α-olefin may be 1-99 wt. %, preferably is 50-80 wt. %. The weight ratio of the dose of the propylene in the first polymerization reaction process to the total does of the ethylene and the α-olefin in the second polymerization reaction process may be 0.2-100:1, preferably is 0.5-10:1. Furthermore, it should be noted: the first olefin monomer is different from the second olefin monomer, which means the kind of the first olefin monomer is not the same as the kind of the second olefin monomer fully, i.e., the first olefin monomer may be different from the second olefin monomer fully or partially.

The catalyst may be any substance that can be used to catalyze the olefin monomer to have a polymerization reaction in the prior art. Examples of the catalyst include, but are not limited to at least one of Ziegler-Natta catalyst, metallocene catalyst, and non-metallocene catalyst. Wherein, the specific compositions of those catalysts are well known to those skilled in the art. For example, the Ziegler-Natta catalyst may be an $MgCl_2$ supported catalyst system or $VOCl_3$-$AlEt_2C_1$ catalyst system, etc. Specifically, the $MgCl_2$ supported catalyst system usually contains $MgCl_2$, $TiCl_4$, alkyl aluminum and/or alkoxy aluminum, and optional internal electron donor and/or external electron donor. The specific composition is well known to those skilled in the art, and will not be detailed further here.

There is no particular restriction on the conditions of the first polymerization reaction and the second polymerization reaction in the present invention. For example, the conditions of the first polymerization reaction usually include: reaction temperature in the range of 30-90° C., preferably 40-80° C., more preferably 60-75° C.; reaction time in the range of 0.05-10 h, preferably 0.1-2 h, more preferably 0.1-0.5 h. Furthermore, if the first olefin monomer charged in the first polymerization reaction is in a gas state, the conditions of the first polymerization reaction further include: reaction pressure in the range of 0-40 atm, preferably 1-35 atm, more preferably 5-10 atm. The conditions of the second polymerization reaction usually include: reaction temperature in the range of 60-120° C., preferably 75-95°

C., more preferably 80-90° C.; reaction time in the range of 0.1-10 h, preferably 0.1-2 h, more preferably 0.2-0.5 h. Furthermore, if the second olefin monomer charged in the second polymerization reaction is in a gas state, the conditions of the second polymerization reaction further include: reaction pressure in the range of 0.1-15 atm, preferably 0.2-10 atm, more preferably 4-6 atm. In the present invention, the pressure value refers to gauge pressures. Furthermore, the first polymerization reaction and/or the second polymerization reaction preferably are executed in the presence of hydrogen. In the first polymerization reaction, in relation to 100 pbw first olefin monomer, the dose of the hydrogen may be 0.001-0.5 pbw, preferably is 0.005-0.1 pbw; in the second polymerization reaction, in relation to 100 pbw second olefin monomer, the dose of the hydrogen may be 0.001-5 pbw, preferably is 0.02-0.15 pbw.

According to the method of preparing an in-reactor polyolefin alloy provided in the present invention, preferably the method further comprises: washing the product obtained by the second olefin polymerization reaction with water and/or alcohol at 20-120° C. after the second olefin polymerization reaction is finished, so that the degree of branching or crosslinking of the in-reactor polyolefin alloy can be further improved, and thereby the impact toughness of the in-reactor polyolefin alloy can be further improved. Wherein, the alcohol may be a conventional choice in the art. Examples of the alcohol include, but are not limited to at least one of methanol, ethanol, n-propanol, isopropanol, and n-butanol, etc.

Furthermore, the present invention further provides an in-reactor polyolefin alloy obtained by the above-mentioned method.

Hereunder the present invention will be detailed in examples.

In the following examples and reference examples, the gel content in the in-reactor polyolefin alloy is measured with the following method:

The in-reactor polyolefin alloy is dried in an vacuum drying oven at 50° C. till the weight doesn't change any more, the dry polymer is weighed and the weight is denoted as $W_1$, then the dried in-reactor polyolefin alloy is dissolved in dimethyl benzene at 135° C. while the solution is oscillated till the in-reactor polyolefin alloy is dissolved extensively, the solution is filtered through a 200-mesh stainless steel screen, the undissolved polymer left on the stainless steel screen is collected, and then dried in a vacuum drying oven at 100° C. for 4 h, then the dry polymer is weighed and the weight is denoted as $W_2$; then the gel content in the in-reactor polyolefin alloy is calculated with the following formula:

Gel content(wt. %)=$(W_2/W_1) \times 100$(wt. %).

Example 1

This example is provided to describe the method of preparing an in-reactor polyolefin alloy provided in the present invention.

In a vacuum state, 500 g liquid propylene monomer is loaded into a reactor, then 0.25 mol triethyl aluminum, 20 mg olefin polymerization catalyst (MgCl$_2$/TiCl$_4$/BMMF, wherein BMMF is an internal electron donor 9,9-dimethoxy fluorene, and the mass ratio of MgCl$_2$ to TiCl$_4$ to BMMF is 80:12:8), and 0.2 g hydrogen are charged in sequence at 30° C., and then the reaction temperature is increased to 70° C., and the mixture is held at the temperature for 0.2 h for reaction. Next, the residual propylene monomer in the reactor is discharged, and the temperature in the reactor is decreased to 50° C.; then 0.10 mL di-(7-octenyl) dichlorosilane is added, and a gas mixture of 20 g ethylene and 60 g propylene is charged into the reactor, and the reaction temperature is controlled at 90° C. for 0.2 h for reaction; after the reaction is finished, acidified ethanol is added to terminate the polymerization reaction, and then the product is washed with 50° C. deionized water and 50° C. ethanol for 3 times respectively; finally the product is vacuum-dried at 60° C.; thus, an in-reactor polypropylene alloy is obtained. Measured in a detection process, the concentration of di-(7-octenyl) dichlorosilane in the in-reactor polypropylene alloy is 278 ppm, the rubber phase in the in-reactor polypropylene alloy has a crosslinked structure, and the gel content in the in-reactor polypropylene alloy is 50 wt. %.

Comparative Example 1

This comparative example is provided to describe the method of preparing an reference in-reactor polyolefin alloy.

The in-reactor polyolefin alloy is prepared by the method described in Example 1, but no di-(7-octenyl) dichlorosilane is added; thus, a reference in-reactor polypropylene alloy is obtained.

Comparative Example 2

This comparative example is provided to describe the method of preparing an reference in-reactor polyolefin alloy.

The in-reactor polyolefin alloy is prepared by the method described in Example 1, but the di-(7-octenyl) dichlorosilane is replaced with tetrachlorosilane in the same volume; thus, a reference in-reactor polypropylene alloy is obtained.

Comparative Example 3

This comparative example is provided to describe the method of preparing an reference in-reactor polyolefin alloy.

The in-reactor polyolefin alloy is prepared by the method described in Example 1, but the di-(7-octenyl) dichlorosilane is replaced with tetramethoxysilane in the same volume; thus, a reference in-reactor polypropylene alloy is obtained.

Example 2

This example is provided to describe the method of preparing an in-reactor polyolefin alloy provided in the present invention.

In a vacuum state, 500 g liquid propylene monomer is loaded into a reactor, then 0.25 mol triethyl aluminum, 20 mg olefin polymerization catalyst (MgCl$_2$/TiCl$_4$/BMMF, wherein BMMF is an internal electron donor 9,9-dimethoxy fluorene, and the mass ratio of MgCl$_2$ to TiCl$_4$ to BMMF is 80:15:5), and 0.2 g hydrogen are charged in sequence at 30° C., and then the reaction temperature is increased to 70° C., and the mixture is held at the temperature for 0.2 h for reaction. Next, the residual propylene monomer in the reactor is discharged, and the temperature in the reactor is decreased to 50° C.; then 0.05 mL di-[2-(5-ethylidene-2-norbornene) ethyl] dichlorosilane is added, and a gas mixture of 20 g ethylene and 60 g propylene is charged into the reactor, and the reaction temperature is controlled at 90° C. for 0.5 h for reaction; after the reaction is finished, acidified ethanol is added to terminate the polymerization reaction, and then the product is washed with 90° C. deionized water and 80° C. ethanol for 3 times respectively; finally the product is vacuum-dried at 60° C.; thus, an in-reactor polypropylene alloy is obtained. Measured in a detection process, the concentration of di-[2-(5-ethylidene-2-norbornene) ethyl] dichlorosilane in the in-reactor polypropylene alloy is 125 ppm, the rubber phase in the in-reactor polypropylene alloy has a crosslinked structure, and the gel content in the in-reactor polypropylene alloy is 70 wt. %.

Example 3

This example is provided to describe the method of preparing an in-reactor polyolefin alloy provided in the present invention.

In a vacuum state, 500 g liquid propylene monomer is loaded into a reactor, then 0.25 mol triethyl aluminum, 20 mg olefin polymerization catalyst ($MgCl_2/TiCl_4$/BMMF, wherein, BMMF is an internal electron donor 9,9-dimethoxy fluorene, and the mass ratio of $MgCl_2$ to $TiCl_4$ to BMMF is 78:12:10), and 0.2 g hydrogen are charged in sequence at 30° C., and then the reaction temperature is increased to 70° C., and the mixture is held at the temperature for 0.2 h for reaction. Next, the residual propylene monomer in the reactor is discharged, and the temperature in the reactor is decreased to 50° C.; 0.1 mL di-[2-(3-cyclohexenyl) ethyl] dichlorosilane is added into the reactor, then a gas mixture of 20 g ethylene and 60 g propylene is charged into the reactor, and the reaction temperature is controlled at 90° C. for 0.5 h for further reaction; after the reaction is finished, an in-reactor polypropylene alloy is obtained. Measured in a detection process, the concentration of di-[2-(3-cyclohexenyl) ethyl] dichlorosilane in the in-reactor polypropylene alloy is 210 ppm, the rubber phase in the in-reactor polypropylene alloy has a crosslinked structure, and the gel content in the in-reactor polypropylene alloy is 65 wt. %.

Example 4

This example is provided to describe the method of preparing an in-reactor polyolefin alloy provided in the present invention.

The in-reactor polyolefin alloy is prepared by the method described in Example 1, but the di-(7-octenyl) dichlorosilane is replaced with 2-(dicyclopentadiene)ethylidene trichlorosilane in the same volume; thus, an in-reactor polypropylene alloy is obtained. Measured in a detection process, the concentration of 2-(dicyclopentadiene) ethylidene trichlorosilane in the in-reactor polypropylene alloy is 142 ppm, the rubber phase in the in-reactor polypropylene alloy has a crosslinked structure, and the gel content in the in-reactor polypropylene alloy is 45 wt. %.

Example 5

This example is provided to describe the method of preparing an in-reactor polyolefin alloy provided in the present invention.

The in-reactor polyolefin alloy is prepared by the method described in Example 1, but the di-(7-octenyl) dichlorosilane is replaced with 7-octenyl dimethoxy chlorosilane in the same volume; thus, an in-reactor polypropylene alloy is obtained. Measured in a detection process, the concentration of 7-octenyl dimethoxy chlorosilane in the in-reactor polypropylene alloy is 856 ppm, the rubber phase in the in-reactor polypropylene alloy has a branched or crosslinked structure, and the gel content in the in-reactor polypropylene alloy is 20 wt. %.

Example 6

This example is provided to describe the method of preparing an in-reactor polyolefin alloy provided in the present invention.

In a vacuum state, 450 g liquid propylene monomer is charged into a reactor, then 0.25 mol triethyl aluminum and 18 mg olefin polymerization catalyst ($MgCl_2/TiCl_4$/BMMF/rac-$Me_2Si$(2-Me-4-PhInd)$_2ZrCl_2$/aluminum methylate, wherein BMMF is an internal electron donor 9,9-dimethoxy fluorene, rac- represents "racemized", Me is methyl, Ph is phenyl, Ind is indentyl, and the mass ratio of $MgCl_2$ to $TiCl_4$ to BMMF to rac-$Me_2Si$(2-Me-4-PhInd)$_2ZrCl_2$ to aluminum methylate is 60:8:5:1:16) are added in sequence at 30° C., the reaction temperature is controlled at 70° C., and the mixture is held at the temperature for 30 min for polymerization reaction; after the polymerization is finished, the residual propylene monomer in the reactor is discharged, and the temperature in the reactor is decreased to 50° C.; then 1.0 mL allyltrichlorosilane is added into the reactor, and a gas mixture of 20 g ethylene and 60 g propylene and 0.05 g hydrogen are charged into the reactor, the reaction temperature is controlled at 90° C. for 0.5 h for further reaction; after the reaction is finished, an in-reactor polypropylene alloy is obtained. Measured in a detection process, the concentration of allyltrichlorosilane in the in-reactor polypropylene alloy is 590 ppm, the rubber phase in the in-reactor polypropylene alloy has a crosslinked structure, and the gel content in the in-reactor polypropylene alloy is 75 wt. %.

Test Cases

The test cases are provided to describe the tests of the mechanical properties of the in-reactor polyolefin alloy.

The impact strength is measured with the method specified in ASTM D256A, and the result is shown in Table 1.

The tensile strength is measured with the method specified in ISO527-2-5A, and the result is shown in Table 1.

TABLE 1

| No. | Gel content, mass % | Impact strength, $kJ/m^2$ | Tensile breaking strength, MPa |
| --- | --- | --- | --- |
| Example 1 | 50 | 55.0 | 13.0 |
| Comparative Example 1 | 0 | 22.4 | 22.5 |
| Comparative Example 2 | 0 | 18.6 | 25.4 |
| Comparative Example 3 | 0 | 19.5 | 26.5 |
| Example 2 | 70 | 59.0 | 10.1 |
| Example 3 | 65 | 56.8 | 11.2 |
| Example 4 | 45 | 50.0 | 14.5 |
| Example 5 | 20 | 32.5 | 18.4 |
| Example 6 | 75 | 50.6 | 9.8 |

It is seen from the above result: the in-reactor polyolefin alloy obtained by the method provided in the present invention contains a highly crosslinked rubber phase, and has higher impact toughness and lower tensile breaking strength. It is seen from the comparison between Example 1 and Example 4-5: if the $R^1$ in the organosilane is a $C_2$-$C_{20}$ alkyl group and a terminal of $R^1$ has an α-double bond, a norbornene group, a cycloolefin group or a dicyclopentadiene group, X is a halogen element, $R^2$ is a $C_1$-$C_{10}$ linear chain, branched chain or isomerized alkyl group, m is 2 or 3, n is 1 or 2, k is 0, and m+n+k=4, the rubber phase in the obtained in-reactor polyolefin alloy is crosslinked to a higher degree, and the in-reactor polyolefin alloy has higher impact strength and lower tensile breaking strength. It is seen from the comparison between Example 1 and Comparative Example 2-3: the organosilane provided in the present invention behaves differently from silicon tetrahlaide and tetraalkoxysilane in the olefin polymerization reaction process, and the in-reactor polyolefin alloy obtained with the organosilane provided in the present invention has higher impact toughness and lower tensile breaking strength.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A method of preparing an in-reactor polyolefin alloy comprising: conducting a first polymerization reaction, of a polymerization reaction system, between a first olefin monomer in the presence of a catalyst, and then charging a second olefin monomer into the polymerization reaction system to perform a second polymerization reaction, wherein
the first olefin monomer is different from the second olefin monomer,
one or more of the first polymerization reaction and the second polymerization reaction is executed in the presence of an organosilane represented by a general formula $R^1{}_m SiX_n(OR^2)_k$,
$R^1$ is a $C_2$-$C_{20}$ alkyl group and a terminal of $R^1$ has an α-olefin double bond, a norbornene group, a cycloolefin group or a dicyclopentadiene group, X is a halogen element, $R^2$ is a $C_1$-$C_{20}$ linear chain or branched chain alkyl group, m is 2 or 3, n is 1 or 2, k is 0, and m+n+k=4, and
the catalyst is at least one of a Ziegler-Natta catalyst and a metallocene catalyst.

2. The method according to claim 1, wherein the organosilane is at least one of 7-octenyl allyl dichlorosilane, 7-octenyl vinyl dichlorosilane, 5-hexenyl allyl dichlorosilane, 7-octenyl di-(allyl) chlorosilane, di-(7- octenyl) allyl chlorosilane, di-(7-octenyl) dichlorosilane, triallyl chlorosilane, di- (allyl) dichlorosilane, 2-(5-ethylidene-2-norbornene) ethyl allyl dichlorosilane, di-[2- (5-ethylidene-2-norbornene) ethyl] dichlorosilane, di-[2-(3-cyclohexenyl) ethyl] dichlorosilane, 2-(dicyclopentathene) ethylidene allyl dichlorosilane, and di-[2- (dicyclopentadiene) ethylidene] dichlorosilane.

3. The method according to claim 1, wherein in relation to 100 pbw total dose of the first olefin monomer and the second olefin monomer, the total dose of the organosilane is 0.0001-20 pbw.

4. The method according to claim 1, wherein the first polymerization reaction is executed without the presence of the organosilane, while the second polymerization reaction is executed in the presence of the organosilane.

5. The method according to claim 1 further comprising: washing the product obtained by the second olefin polymerization reaction with water and/or alcohol at 20-120° C., after the second olefin polymerization reaction is finished.

6. An in-reactor polyolefin alloy prepared by the method according to claim 1.

7. The method according to claim 1, wherein the first olefin monomer is propylene, and the second olefin monomer is a mixture of ethylene and α-olefin.

8. The method according to claim 1, wherein the conditions of the first polymerization reaction include: reaction temperature in the range of 30-90° C., reaction time in the range of 0.05-10 h; the conditions of the second polymerization reaction include: reaction temperature in the range of 60- 120° C., reaction time in the range of 0.1-10 h.

* * * * *